(12) United States Patent
Tamai et al.

(10) Patent No.: US 8,519,656 B2
(45) Date of Patent: Aug. 27, 2013

(54) SYNCHRONOUS MACHINE STARTING DEVICE

(75) Inventors: Shinzo Tamai, Minato-ku (JP); Yosuke Fujii, Minato-ku (JP); Akinobu Ando, Minato-ku (JP); Yasuhiko Hosokawa, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 342 days.

(21) Appl. No.: 13/122,157

(22) PCT Filed: Oct. 1, 2008

(86) PCT No.: PCT/JP2008/067798
§ 371 (c)(1),
(2), (4) Date: Apr. 1, 2011

(87) PCT Pub. No.: WO2010/038282
PCT Pub. Date: Apr. 8, 2010

(65) Prior Publication Data
US 2011/0181220 A1 Jul. 28, 2011

(51) Int. Cl.
*H02P 6/20* (2006.01)
*H02P 6/18* (2006.01)

(52) U.S. Cl.
CPC ........ *H02P 6/185* (2013.01)
USPC ...... 318/400.33; 318/400.32; 318/400.01; 318/700

(58) Field of Classification Search
CPC ........ H02P 6/185
USPC ........ 318/400.33, 400.32, 400.01, 700
See application file for complete search history.

(56) References Cited

U.S. PATENT DOCUMENTS

| 5,363,032 | A | * | 11/1994 | Hanson et al. ............ 322/10 |
| 6,005,365 | A | | 12/1999 | Kaneko et al. |
| 6,242,882 | B1 | | 6/2001 | Kaneko et al. |
| 2003/0011340 | A1 | | 1/2003 | Odachi et al. |

FOREIGN PATENT DOCUMENTS

| JP | 10 323099 | 12/1998 |
| JP | 2002 369572 | 12/2002 |
| JP | 2004 72906 | 3/2004 |
| JP | 2006 271038 | 10/2006 |

OTHER PUBLICATIONS

U.S. Appl. No. 13/129,993, filed May 18, 2011, Tamai, et al.
U.S. Appl. No. 13/132,792, filed Jun. 3, 2011, Tamai, et al.
International Search Report issued Jan. 13, 2009 in PCT/JP08/67798 filed Oct. 1, 2008.

* cited by examiner

*Primary Examiner* — Bentsu Ro
*Assistant Examiner* — David Luo
(74) *Attorney, Agent, or Firm* — Oblon, Spivak, McClelland, Maier & Neustadt, L.L.P.

(57) ABSTRACT

A synchronous machine starting device in which AC power is supplied to an armature of a synchronous machine, the supplied AC voltage is detected to determine a rotor position of the synchronous machine, and the supplied power is controlled based on the detected rotor position. To detect rotor position, a first position signal indicating a timing at which a level of AC voltage supplied to the armature of the synchronous machine reaches a prescribed value is output. An error of an estimated phase is calculated based on the estimated phase indicating the rotor position and the detected AC voltage, and the estimated phase is calculated based on the calculated error to produce a second position signal indicating the calculated estimated phase. A selected of first and second position signals is output to indicate the rotor position of the synchronous machine for control of AC power supplied to the armature.

25 Claims, 11 Drawing Sheets

SYNCHRONOUS MACHINE STARTING DEVICE

TECHNICAL FIELD

The present invention relates to a synchronous machine starting device, and more particularly to a synchronous machine starting device which detects a rotor position of a synchronous machine.

BACKGROUND ART

Synchronous machine starting devices for starting synchronous machines such as generators and motors have been developed. Conventionally, a synchronous machine starting device uses a mechanical distributor which detects the position of a rotor of a synchronous machine, for example, by a proximity switch. However, the mechanical distributor is fragile and is susceptible to noise due to a large amount of wiring.

Japanese Patent Laying-Open No. 2006-271038 (Patent Document 1) discloses an example of a synchronous machine starting device for eliminating the need for such a mechanical distributor. Specifically, this synchronous generator starting device includes a separately excited converter formed of a separately excited element such as a thyristor and a separately excited inverter formed of a separately excited element such as a thyristor for converting DC (direct current) power obtained from the converter into AC (alternating current) power, to start a synchronous generator using AC power obtained from the inverter. Then, the synchronous generator starting device includes an AC voltage detector detecting voltage of an armature terminal of the synchronous generator, an AC current detector detecting inverter output current fed from the inverter into an armature of the synchronous generator, an induction voltage operation circuit calculating an in-phase component and a quadrature component with respect to a first reference phase, of induction voltage induced at an armature winding of the synchronous generator by field current of the synchronous generator, from an AC current detection value of the inverter from the output current detector and a first synchronous generator rotational speed estimated value, and a PLL circuit outputting a second reference phase and a second synchronous generator rotational speed estimated value such that the orthogonal component of the first reference phase of the induction voltage from the induction voltage operation circuit is zero. Then, the synchronous generator starting device generates a gate pulse of the inverter at a predetermined control advance angle based on the second reference phase output from the PLL circuit, and, in addition, inputs the second reference phase to the first reference phase of the induction voltage operation circuit and inputs the second synchronous generator rotational speed estimated value to the first synchronous generator rotational speed estimated value of the induction voltage operation circuit.

Prior Art Documents

Patent Documents

Patent Document 1: Japanese Patent Laying-Open No. 2006-271038

SUMMARY OF THE INVENTION

Problems to be Solved by the Invention

The voltage supplied to the armature of a synchronous machine at the time of starting is as extremely small as, for example, one-thousandth of a rated voltage at the time of steady operation. Therefore, with the configuration disclosed in Patent Document 1, it is difficult to detect the voltage supplied to the armature of the synchronous machine with high accuracy at the time of starting and to accurately detect the position of the rotor, so that the synchronous machine sometimes cannot be started stably.

Therefore, an object of the present invention is to provide a synchronous machine starting device capable of stably starting a synchronous machine.

Means for Solving the Problems

A synchronous machine starting device in accordance with an aspect of the present invention includes a power conversion unit for converting supplied power into AC power and supplying the AC power to an armature of a synchronous machine, an AC voltage detection unit for detecting AC voltage supplied to the armature of the synchronous machine, a rotor position detection unit for detecting a rotor position of the synchronous machine, based on the detected AC voltage, and a power conversion control unit for controlling the power conversion unit, based on the detected rotor position. The rotor position detection portion includes a level monitoring unit for outputting a first position signal indicating a timing at which a level of AC voltage supplied to the armature of the synchronous machine reaches a prescribed value, based on the detected AC voltage, a feedback operation unit for calculating an error of an estimated phase based on the estimated phase indicating the rotor position and the detected AC voltage, calculating the estimated phase based on the calculated phase error, and outputting a second position signal indicating the calculated estimated phase, and a selector circuit receiving the first position signal or a position signal obtained based on the first position signal, and the second position signal, selecting one of the received two position signals, and outputting the selected signal to the power conversion control portion as a signal indicating the rotor position of the synchronous machine.

Preferably, the rotor position detection unit further includes an AC signal generation unit outputting a third position signal that is an AC signal having a prescribed frequency. The selector circuit selects one of the first position signal, the second position signal, and the third position signal, and outputs the selected signal to the power conversion control unit as a signal indicating the rotor position of the synchronous machine.

More preferably, the rotor position detection portion further includes a switching circuit for switching whether or not to output the first position signal to the AC signal generation unit. The AC signal generation unit adjusts a phase of the third position signal based on the first position signal received from the switching circuit.

More preferably, the selector circuit selects the first position signal, and thereafter selects the third position signal after the AC signal generation unit adjusts a phase of the third position signal based on the first position signal.

More preferably, the rotor position detection unit further includes a switching circuit for switching whether or not to output the third position signal to the feedback operation unit. The feedback operation unit adjusts a phase of the second position signal based on the third position signal received from the switching circuit.

More preferably, the selector circuit selects the third position signal, and thereafter selects the second position signal after the feedback operation unit adjusts a phase of the second position signal based on the third position signal.

More preferably, the selector circuit selects the first position signal, the third position signal, and the second position signal, in this order, and outputs the selected signal to the power conversion control unit.

More preferably, the AC signal generation unit outputs a third position signal having a frequency corresponding to a predetermined rotational speed of the rotor during standby of the synchronous machine.

More preferably, the selector circuit selects the first position signal and the third position signal, in this order, based on a level of the detected AC voltage, and outputs the selected signal to the power conversion control portion.

More preferably, the selector circuit deselects the first position signal and selects the third position signal when a prescribed time has elapsed since a level of the detected AC voltage reaches a prescribed value or higher.

More preferably, the selector circuit selects the third position signal and the second position signal, in this order, based on a level of the detected AC voltage, and outputs the selected signal to the power conversion control portion.

More preferably, the selector circuit deselects the third position signal and selects the second position signal when a prescribed time has elapsed since a level of the detected AC voltage reaches a prescribed value or higher.

Preferably, the rotor position detection unit further includes a switching circuit for switching whether or not to output the first position signal to the feedback operation unit. The feedback operation unit adjusts a phase of the second position signal based on the first position signal received from the switching circuit.

More preferably, the selector circuit selects the first position signal, and thereafter selects the second position signal after the feedback operation unit adjusts a phase of the second position signal based on the first position signal.

Preferably, the selector circuit selects the first position signal and the second position signal, in this order, and outputs the selected signal to the power conversion control unit.

Preferably, the selector circuit selects the first position signal and the second position signal, in this order, based on a level of the detected AC voltage, and outputs the selected signal to the power conversion control unit.

More preferably, the selector circuit deselects the first position signal and selects the second position signal when a prescribed time has elapsed since a level of the detected AC voltage reaches a prescribed value or higher.

Preferably, the rotor position detection portion further includes an AC signal generation unit for outputting a third position signal which is an AC signal having a prescribed frequency, and a switching circuit for switching whether or not to output the first position signal to the AC signal generation unit. The AC signal generation unit adjusts a phase of the third position signal based on the first position signal received from the switching circuit. The selector circuit selects one of the second position signal and the third position signal and outputs the selected signal to the power conversion control unit as a signal indicating the rotor position of the synchronous machine.

More preferably, the selector circuit selects the third position signal and the second position signal, in this order, and outputs the selected signal to the power conversion control unit.

More preferably, the selector circuit selects the third position signal and the second position signal, in this order, based on a level of the detected AC voltage, and outputs the selected signal to the power conversion control unit.

More preferably, the selector circuit deselects the third position signal and selects the second position signal when a prescribed time has elapsed since a level of the detected AC voltage reaches a prescribed value or higher.

More preferably, the rotor position detection unit further includes a switching circuit for switching whether or not to output the third position signal to the feedback operation unit. The feedback operation unit adjusts a phase of the second position signal based on the third position signal received from the switching circuit.

More preferably, the selector circuit selects the third position signal, and thereafter selects the second position signal after the feedback operation portion adjusts a phase of the second position signal based on the third position signal.

More preferably, the AC signal generation portion outputs a third position signal having a frequency corresponding to a predetermined rotational speed of the rotor during standby of the synchronous machine.

Preferably, the synchronous machine starting device further includes an AC current detection unit for detecting AC current supplied to the armature of the synchronous machine. The feedback operation unit calculates induction voltage induced at the armature of the synchronous machine based on an estimated phase indicating the rotor position, an estimated rotational speed of the rotor, and the detected AC voltage and AC current, calculates an error of the estimated phase based on the calculated induction voltage, calculates the estimated phase and the estimated rotational speed based on the calculated phase error, and outputs the second position signal indicating the calculated estimated phase.

Effects of the Invention

According to the present invention, a synchronous machine can be started stably.

DESCRIPTION OF THE REFERENCE SIGNS 1 converter, 2 inverter, 3 DC reactor, 4 AC voltage detector, 8 AC voltage detector, 9 AC current detector, 11, 81, 82, 83, 84 rotor position detection portion, 12 reference sinusoidal wave operator, 13 gate pulse generator, 14 β command circuit, 19 inverter control unit (power conversion control unit), 21 zero cross detection unit (level monitoring unit), 22 PLL unit (AC signal generation unit), 23 PLL unit (feedback operation unit), 31, 32 three-phase to two-phase conversion circuit, 33 induction voltage operation circuit, 34 PLL circuit, 71 power conversion unit, 101 synchronous machine starting device, SEL selector circuit, SW1 to SW7 switching circuit, INT integrator, 35 PGEN position signal generator.

MODES FOR CARRYING OUT THE INVENTION

In the following, embodiments of the present invention will be described with reference to the figures. It is noted that the same or corresponding parts in the figures are denoted with the same reference signs, and a description thereof will not be repeated.

<First Embodiment>

Figure 1:
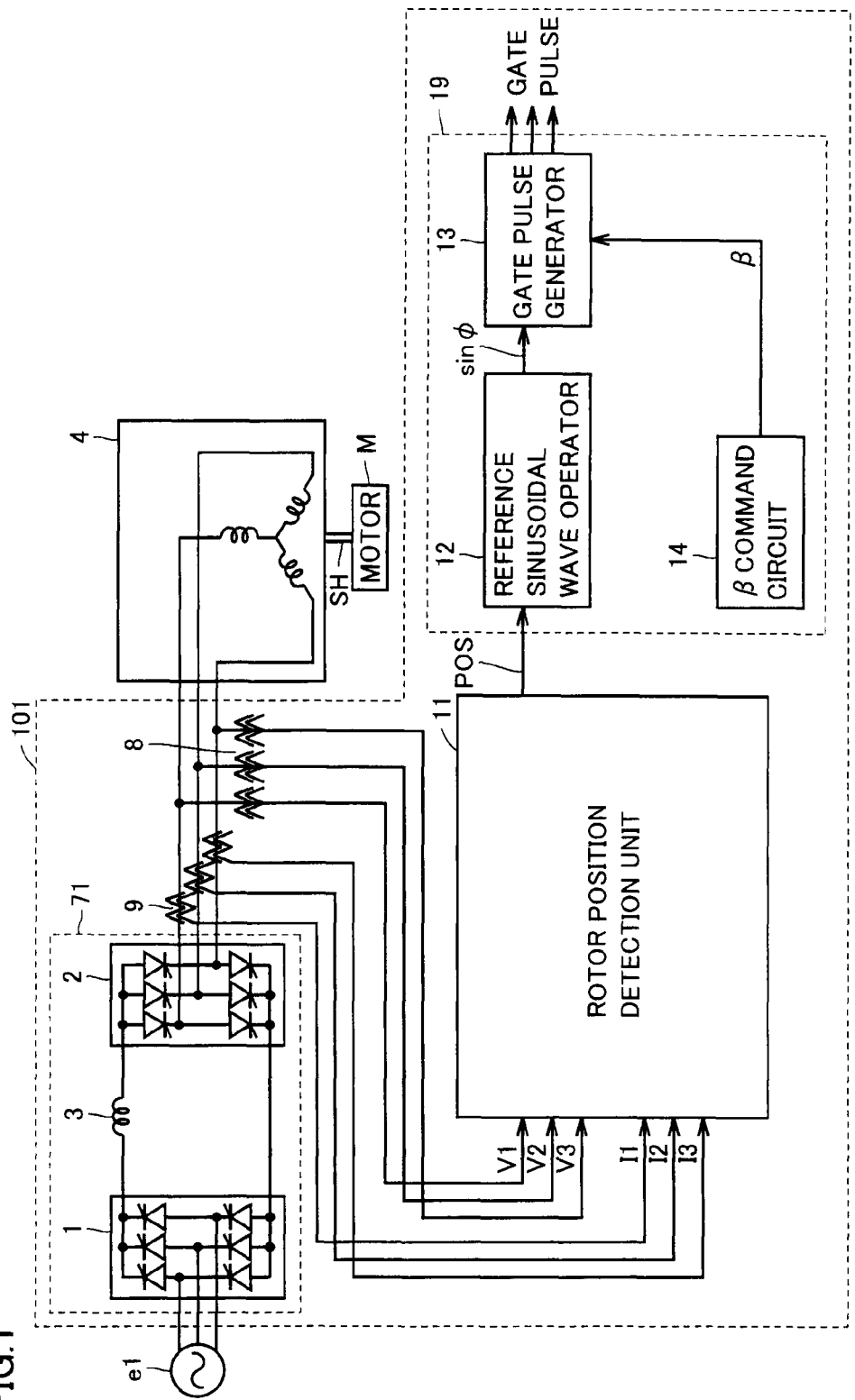
FIG. 1 is a diagram showing a configuration of a synchronous machine starting device in accordance with a first embodiment of the present invention.

FIG. 1 is a diagram showing a configuration of a synchronous machine starting device in accordance with a first embodiment of the present invention.

Referring to FIG. 1, a synchronous machine starting device 101 includes a power conversion unit 71, an AC voltage detector 8, an AC current detector 9, a rotor position detection unit 11, and an inverter control unit (power conversion control unit) 19. Power conversion unit 71 includes a converter 1, an inverter 2, and a DC reactor 3. Inverter control unit 19 includes a reference sinusoidal wave operator 12, a gate pulse generator 13, and a β command circuit 14.

A synchronous machine 4 and a motor M are connected with each other via a shaft SH. Synchronous machine 4 is, for example, a synchronous generator or a synchronous motor and has an armature and a rotor. Motor M rotates at a prescribed speed when synchronous machine 4 is on standby. The rotational speed is low, for example, a few rpm. By contrast, the rotational speed in the normal operation is 3000 rpm to 3600 rpm. Therefore, the voltage applied to the armature of synchronous machine 4 at the time of starting is as extremely small as one-thousandth of the steady operation, as described above, and is difficult to detect accurately, partly because the detection voltage by AC voltage detector 8 is often distorted.

Converter 1 is formed of a plurality of elements such as thyristors and converts AC power from an AC power supply el into DC power.

Inverter 2 is formed of a plurality of elements such as thyristors and converts the DC power obtained from converter 1 into AC power for supply to the armature of synchronous machine 4, thereby driving synchronous machine 4.

Converter 1 and inverter 2 are connected with each other via DC reactor 3. The AC side of inverter 2 is connected to the armature of synchronous machine 4.

AC voltage detector 8 detects three-phase AC voltage supplied to the armature of synchronous machine 4 and outputs voltage detection values V1, V2, V3 to rotor position detection unit 11.

AC current detector 9 detects the three-phase AC current supplied to the armature of synchronous machine 4 and outputs current detection values I1, I2, I3 to rotor position detection unit 11.

Rotor position detection unit 11 detects the rotor position (phase) of synchronous machine 4, based on the detection values received from AC voltage detector 8 and AC current detector 9, and outputs a rotor position signal POS to inverter control portion 19 to indicate the rotor position of synchronous machine 4.

Inverter control portion 19 controls inverter 2 based on rotor position signal POS received from rotor position detection portion 11.

In inverter control portion 19, reference sinusoidal wave operator 12 outputs a reference sinusoidal wave sin φ based on position signal POS received from rotor position detection portion 11.

β command circuit 14 calculates and outputs a control-advance-angle command value β to gate pulse generator 13.

Gate pulse generator 13 outputs a gate pulse to each element in inverter 2, based on reference sinusoidal wave sin φ received form reference sinusoidal wave operator 12 and control lead angle command value β received from β command circuit 14.

Figure 2:
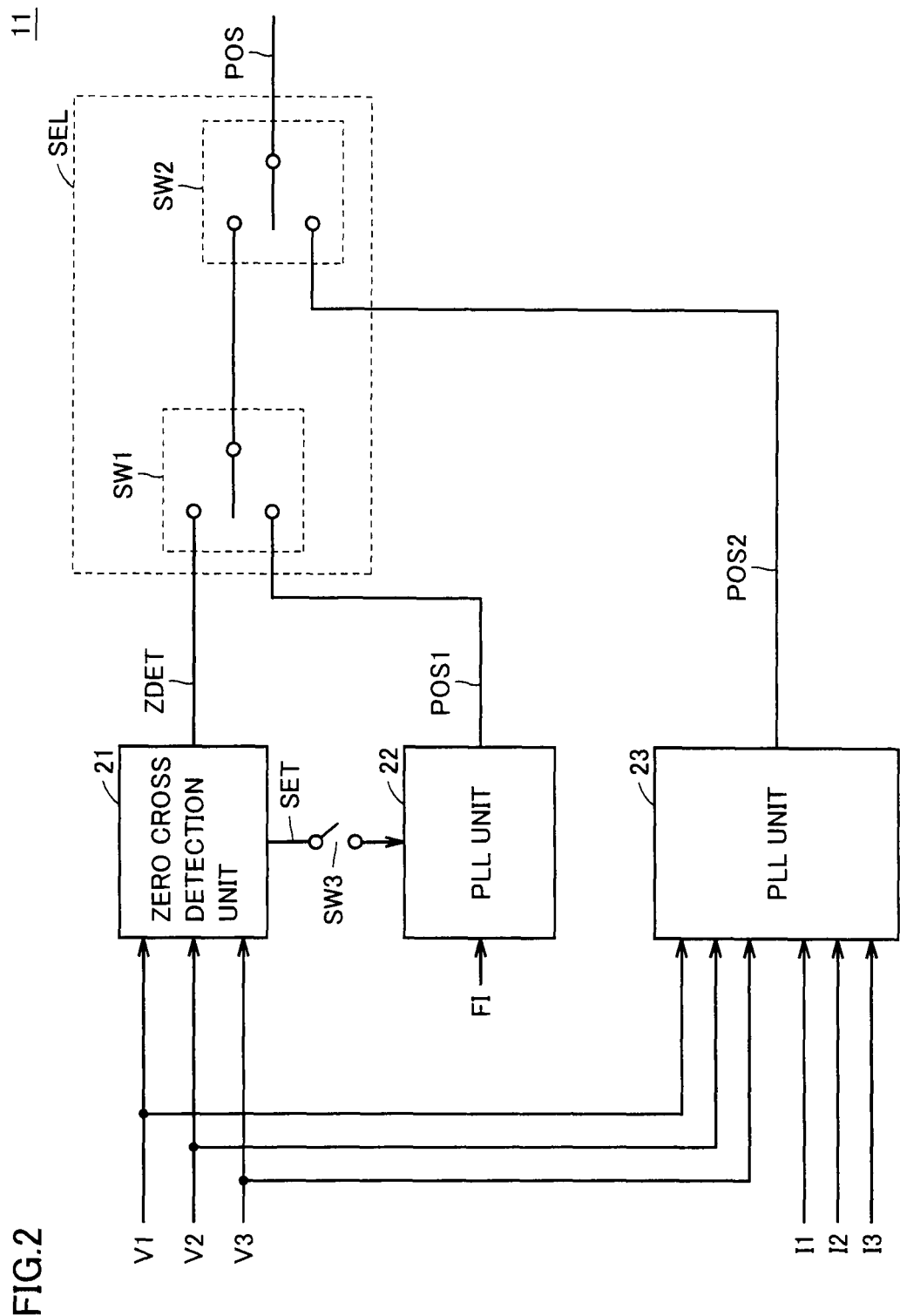
FIG. 2 is a diagram showing a configuration of a rotor position detection portion

FIG. 2 is a diagram showing a configuration of rotor position detection unit 11

Referring to FIG. 2, rotor position detection unit 11 includes a zero cross detection unit (level monitoring unit) 21, a PLL (Phase Locked Loop) unit (AC signal generation unit) 22, a PLL unit (feedback operation unit) 23, a selector circuit SEL, and a switching circuit SW3. Selector circuit SEL includes switching circuits SW1 and SW2.

Zero cross detection unit 21 performs zero-cross detection of AC voltage supplied to the armature of synchronous machine 4, based on voltage detection values V1, V2, V3 received from AC voltage detector 8. In other words, zero cross detection unit 21 detects the timing at which the level of AC voltage supplied to the armature of synchronous machine 4 becomes almost zero volt, and outputs a detection signal ZDET indicating the detected timing. Zero cross detection unit 21 also outputs a detection signal SET indicating the phase of the rotor of synchronous machine 4 which is estimated from detection signal ZDET.

Switching circuit SW3 switches whether or not to output detection signal SET received from zero cross detection unit 21 to PLL portion 22.

PLL unit 22 outputs a position signal POS1 which is an AC signal having a prescribed frequency FI. Here, prescribed frequency FI is a frequency corresponding to a predetermined rotational speed of the rotor during standby of synchronous machine 4. PLL unit 22 also adjusts the phase of position signal POS1 based on detection signal SET received from switching circuit SW3.

Figure 3:
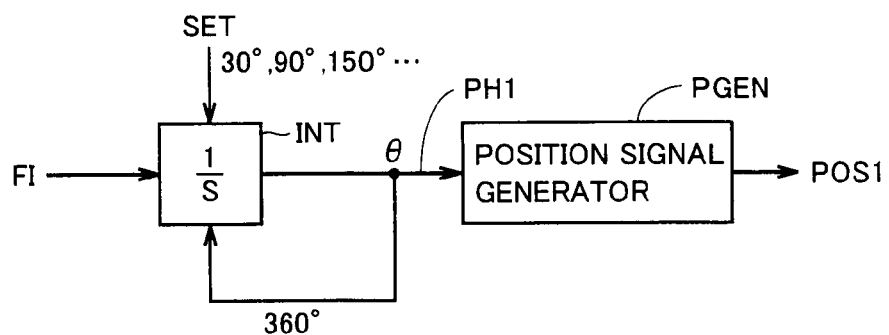
FIG. 3 is a diagram conceptually showing a configuration of a PLL unit 22.
Figure 4:
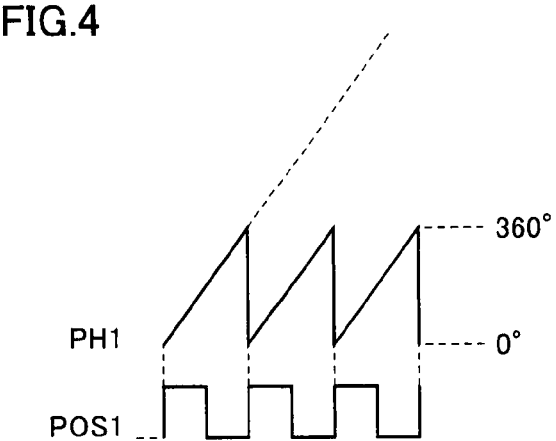
FIG. 4 is a diagram showing waveforms of a phase signal PHI and a position signal POS1 generated by PLL unit 22.
Figure 5:
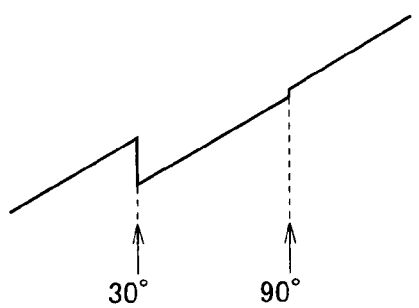
FIG. 5 is a diagram showing phase adjustment of phase signal PHI by PLL unit 22.

FIG. 3 is a diagram conceptually showing a configuration of PLL unit 22. FIG. 4 is a diagram showing waveforms of a position signal PHI and position signal POS1 generated by PLL unit 22. FIG. 5 is a diagram showing phase adjustment of position signal PHI by PLL unit 22.

Referring to FIG. 3 to FIG. 5, PLL unit 22 includes an integrator INT and a position signal generator PGEN. Integrator INT integrates a value corresponding to initial frequency FI and converts the value into a phase θ, which is then output as phase signal PHI. Integrator INT resets phase θ to 0° when it reaches 360°. In other words, phase signal PHI is an AC signal whose amplitude is phase θ. Integrator INT corrects phase θ based on the angle such as 30°, 90°, 150° indicated by detection signal SET received from zero cross detection unit 21. Position signal generator PGEN generates position signal POS1 based on the phase indicated by phase signal PHI received from integrator INT. As shown in FIG. 4, for example, position signal generator PGEN converts phase signal PHI into a pulse-like AC signal similar to that of the conventional mechanical distributor, and outputs the converted signal as position signal POS1. More specifically, for example, position signal POS1 rises from a logic low level to a logic high level when the phase indicated by phase signal PHI changes from 360° to 0°, and falls from a logic high level to a logic low level when the phase indicated by phase signal PHI changes to 180°

In PLL unit 22, initially, phase θ starts to be increased at any given timing, and then phase θ is adjusted in response to detection signal SET to be synchronized with the AC voltage supplied to the armature of synchronous machine 4. Thus, phase-matching is achieved.

Referring to FIG. 2 again, PLL unit 23 calculates an error of the estimated phase based on the estimated phase indicating the rotor position of synchronous machine 4, that is a phase signal PH2, which will be described later, and voltage detection values V1, V2, V3 received from AC voltage detector 8 and current detection values I1, I2, I3 received from AC current detector 9, and then calculates the estimated phase, that is, phase signal PH2 described later, based on the calculated phase error. Then, PLL portion 23 outputs position signal POS2 obtained from the calculated estimated phase, that is, phase signal PH2 described later, and also performs feedback operation of newly calculating an error of the estimated phase based on the calculated estimated phase and voltage detection values V1, V2, V3 newly received from AC voltage detector 8 and current detection values I1, I2, I3 newly received from AC current detector 9.

Figure 6:
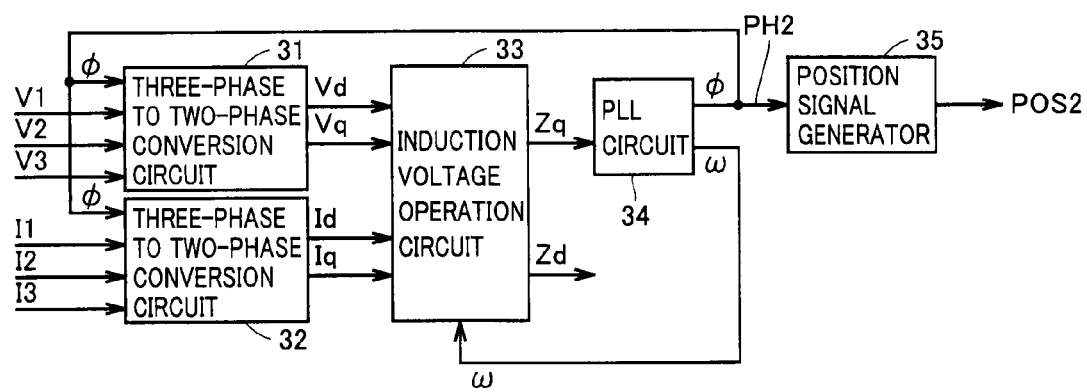
FIG. 6 is a diagram showing a configuration of a PLL unit 23

FIG. 6 is a diagram showing a configuration of PLL unit 23.

Referring to FIG. 6, PLL unit 23 includes three-phase to two-phase conversion circuits 31 and 32, an induction voltage operation circuit 33, a PLL circuit 34, and a position signal generator 35.

Three-phase to two-phase conversion circuit 31 performs three-phase to two-phase conversion (d-q conversion) of voltage detection values V1, V2, V3 received from AC voltage detector 8, based on reference phase φ.

Three-phase to two-phase conversion circuit 32 performs three-phase to two-phase conversion (d-q conversion) of current detection values I1, I2, I3 received from AC current detector 9, based on reference phase φ.

Induction voltage operation circuit 33 calculates induction voltage induced at the armature of synchronous machine 4, based on voltage values Vd and Vq converted by three-phase to two-phase conversion circuit 31 and current values Id and Iq converted by three-phase to two-phase conversion circuit 32.

A reference phase synchronized with the rotation of the rotor of synchronous machine 4 is required to perform coordinate transformation, that is, three-phase to two-phase conversion of voltage and current using three-phase to two-phase conversion circuits 31 and 32. However, in the absence of a position sensor such as a mechanical distributor, this signal cannot be obtained directly.

Then, in the synchronous machine starting device according to the first embodiment of the present invention, three-phase to two-phase conversion circuits 31 and 32 receive input of an initial value of reference phase φ at the time of starting of synchronous machine starting device 101 to perform coordinate transformation.

Then, induction voltage operation circuit 33 calculates induction voltage of the armature on the d-axis (in-phase component)—q-axis (orthogonal component) based on the voltage values and current values on the d-q axis converted by three-phase to two-phase conversion circuits 31 and 32. The calculation of induction voltage requires a rotational speed ω. However, a position sensor is not present, and therefore, an initial value of rotational speed ω of synchronous machine 4 is applied to induction voltage operation circuit 33 at the time of starting of synchronous machine starting device 101.

When the q-axis component Zq of induction voltage calculated by induction voltage operation circuit 33, that is, the orthogonal component with respect to reference phase φ is not zero, the calculation result is shifted with respect to reference phase φ. This q-axis component Zq of induction voltage corresponds to an error of the estimated phase of the rotor in synchronous machine 4. Then, PLL circuit 34 is provided which performs control such that the q-axis component Zq of induction voltage is zero. PLL circuit 34 calculates rotational speed ω, that is, the estimated rotational speed of the rotor of synchronous machine 4 and reference phase φ, that is, the estimated phase of the rotor of synchronous machine 4 such that the q-axis component Zq of induction voltage is zero.

Reference phase φ calculated by PLL circuit 34 is fed back to three-phase to two-phase conversion circuits 31 and 32 and also output to position signal generator 35. Then, position signal generator 35 outputs to selector circuit SEL position signal POS2 having a pulse-like waveform similar to that of a mechanical distributor. Three-phase to two-phase conversion circuits 31 and 32 afterward perform three-phase to two-phase conversion based on reference phase φ from PLL circuit 34.

On the other hand, rotational speed ω calculated by PLL circuit 34 is applied to induction voltage operation circuit 33. Induction voltage operation circuit 33 afterward computes induction voltage (in-phase component) Zd and induction voltage (quadrature component) Zq, based on rotational speed ω from PLL circuit 34.

In the synchronous machine starting device in accordance with the first embodiment of the present invention, PLL unit 23 is configured to calculate an error of the estimated phase, based on the estimated phase indicating the rotor position of synchronous machine 4, and voltage detection values V1, V2, V3 received from AC voltage detector 8 and current detection values I1, I2, I3 received from AC current detector 9. However, the present invention is not limited thereto. PLL unit 23 may be configured to calculate an error of the estimated phase based on the estimated phase indicating the rotor position of synchronous machine 4 and voltage detection values V1, V2, V3 received from AC voltage detector 8.

In the synchronous machine starting device in accordance with the first embodiment of the present invention, PLL circuit 34 is configured to calculate rotational speed ω and reference phase φ only based on the q-axis component Zq of induction voltage. However, the present invention is not limited thereto. PLL circuit 34 may be configured to calculate rotational speed ω and reference phase φ based on the q-axis component Zq and the d-axis component Zd. Such a configuration enables even more accurate operation.

Referring to FIG. 2 again, selector circuit SEL selects one of detection signal ZDET, position signal POS1, and position signal POS2 and outputs to inverter control portion 19 the selected signal as rotor position signal POS indicating the rotor position of synchronous machine 4.

Figure 7:
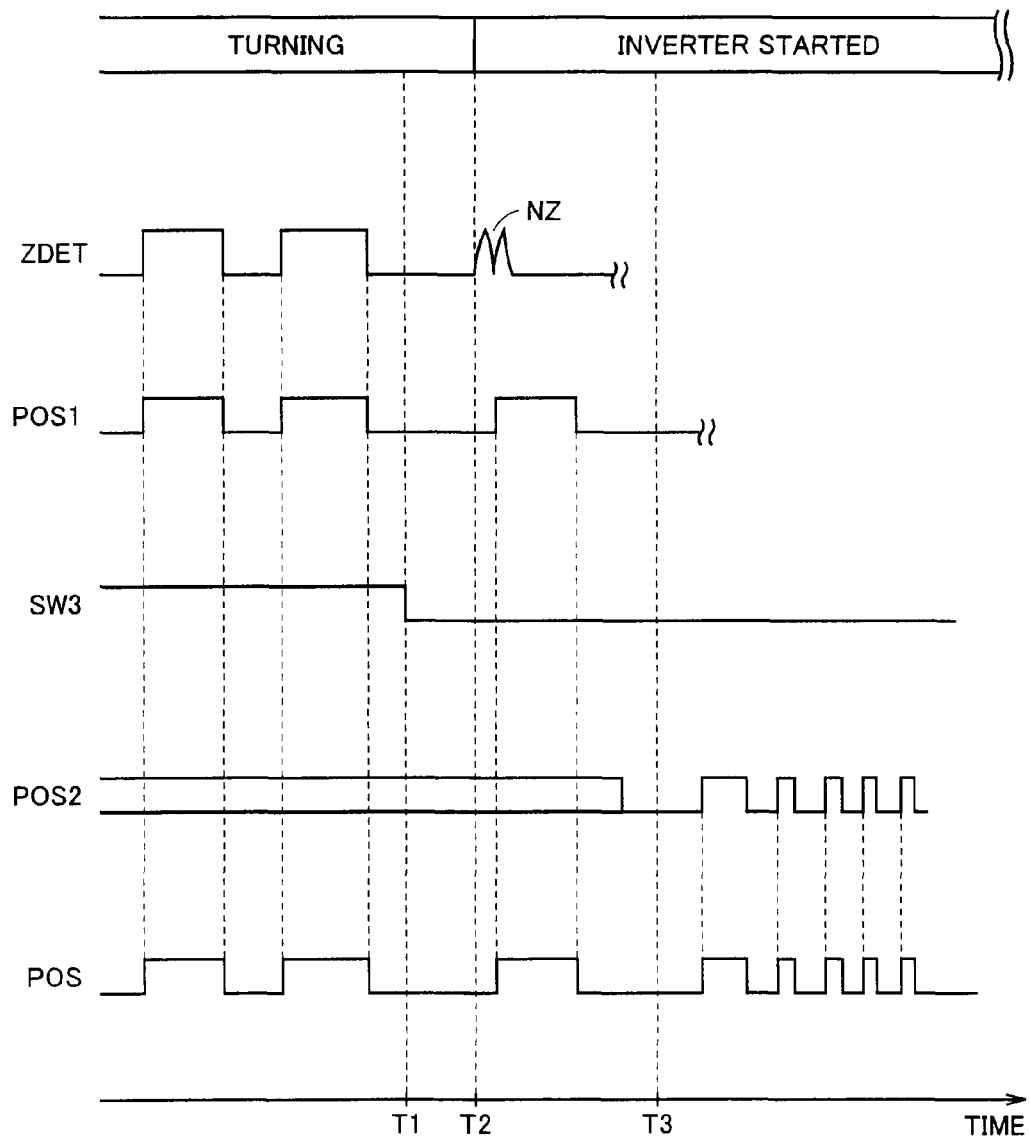
FIG. 7 is a time chart showing an operation of a rotor position detection unit.

FIG. 7 is a time chart showing the operation of the rotor position detection portion.

In the following, the selection by selector circuit SEL and the on/off of switching circuit SW3 are controlled based on, for example, the monitoring results of AC voltage and AC current generated at the armature of synchronous machine 4 or supplied to the armature of synchronous machine 4.

Referring to FIG. 7, before turning, that is, the starting of inverter 2, selector circuit SEL first selects detection signal ZDET from zero cross detection unit 21. In other words, detection signal ZDET is output as rotor position signal POS to reference sinusoidal wave operator 12.

Here, switching circuit SW3 is turned ON, and PLL unit 22 receives detection signal SET from zero cross detection unit 21 to be synchronized with zero cross detection unit 21 and outputs position signal POS1 having almost the same frequency and phase as detection signal ZDET from zero cross detection portion 21.

Then, at a timing T1 immediately before a timing T2 at which inverter 2 is started, selector circuit SEL selects position signal POS1 from PLL unit 22. In other words, position signal POS 1 is output as rotor position signal POS to reference sinusoidal wave operator 12.

At timing T1, switching circuit SW3 is turned OFF, so that PLL portion 22 is not synchronized with zero cross detection portion 21 and enters a free-running state.

Here, at the time of starting of synchronous machine 4, the voltage supplied to the armature of synchronous machine 4 is extremely small as previously mentioned. Therefore, immediately after starting of inverter 2, zero cross detection unit 21 is susceptible to switching noise from inverter 2. More specifically, zero cross detection unit 21 erroneously detects a zero cross point and outputs an erroneous detection signal ZDET as shown by NZ in FIG. 7.

However, in the synchronous machine starting device in accordance with the first embodiment of the present invention, position signal POS1 from PLL unit 22 is selected at timing TI and PLL unit 22 is set in a free-running state, thereby preventing the effect of switching noise from inverter 2.

Furthermore, before timing T1, switching circuit SW3 is turned on to achieve synchronization between PLL unit 22 and zero cross detection unit 21, so that position signal POS1 in the self-running state is almost matched in phase with AC voltage supplied to the armature of synchronous machine 4. It is noted that selector circuit SEL may be configured to select position signal POS1 from PLL unit 22 at a timing Ti when the voltage supplied to the armature of synchronous machine 4 becomes larger than a prescribed value. Accordingly, PLL portion 22 can be synchronized with zero cross detection unit 21 in a state in which the voltage supplied to the armature of synchronous machine 4 reaches the level sufficient to perform zero cross detection, after synchronous machine 4 is excited.

Immediately after the starting, the rotational speed of synchronous machine 4 is low, and therefore, the period of AC voltage supplied to the armature of synchronous machine 4 may be long. Thus, selector circuit SEL may be configured to select position signal POS1 from PLL portion 22 at a timing T1 when a prescribed time has elapsed since the voltage supplied to the armature of synchronous machine 4 becomes higher than a prescribed value. The prescribed time is set such that zero cross detection can be performed accurately. Accordingly, the voltage supplied to the armature of synchronous machine 4 can be detected more accurately.

Then, at a timing T3 when a prescribed time has elapsed since timing T2 at which inverter 2 is started, selector circuit SEL selects position signal POS2 from PLL unit 23. In other words, position signal POS2 is output as rotor position signal POS to reference sinusoidal wave operator 12.

At timing T3 when a prescribed time has elapsed since timing T2 at which inverter 2 is started, the amplitude of AC voltage supplied to the armature of synchronous machine 4 is larger than at the time of starting. Therefore, the effect of switching noise from inverter 2 almost disappears, so that the rotor position can be estimated more accurately using the AC voltage and AC current supplied to the armature of synchronous machine 4, and synchronous machine 4 can be rotated stably.

It is noted that selector circuit SEL may be configured to select position signal POS2 from PLL portion 23 at a timing T3 when the voltage supplied to the armature of synchronous machine 4 exceeds a prescribed value, after timing T2 at which inverter 2 is started.

Alternatively, selector circuit SEL may be configured to select position signal POS2 from PLL unit 23 at a timing T3 when a prescribed time has elapsed since the voltage supplied to the armature of synchronous machine 4 exceeds a prescribed value, after timing T2 at which inverter 2 is started.

Here, the function of rotor position detection portion 11 is implemented by software. For example, the function of rotor position detection unit 11 is built in, for example, a DSP (Digital Signal Processor) which performs a variety of control in synchronous machine starting device 101. This reduces the manufacturing costs.

In addition, this eliminates the time and effort of mounting a distributor at a place where synchronous machine 4 and motor M are installed.

In the synchronous machine starting device in accordance with the first embodiment of the present invention, rotor position detection portion 11 includes zero cross detection unit 21, PLL unit 22, and PLL unit 23, and is configured to select detection signal ZDET from zero cross detection unit 21, position signal POS1 from PLL unit 22, and position signal POS2 from PLL unit 23, in this order, as rotor position detection signal POS, at the time of starting of synchronous machine 4. However, the present invention is not limited thereto. Even if rotor position detection portion 11 does not include PLL portion 22, that is, it is configured to select detection signal ZDET from zero cross detection unit 21 and position signal POS2 from PLL unit 23, in this order, as rotor position detection signal POS, at the time of starting of synchronous machine 4, the voltage supplied to the armature of synchronous machine 4 at the time of starting can be detected with high accuracy, so that synchronous machine 4 can be started stably.

It is noted that even when rotor position detection unit 11 does not include PLL unit 22, timing T3 can be set to one of the timings when a prescribed time has elapsed since timing T2, when the voltage supplied to the armature of synchronous machine 4 exceeds a prescribed value after timing T2, and when a prescribed time has elapsed since the voltage supplied to the armature of synchronous machine 4 exceeds a prescribed value after timing T2.

Figure 8:
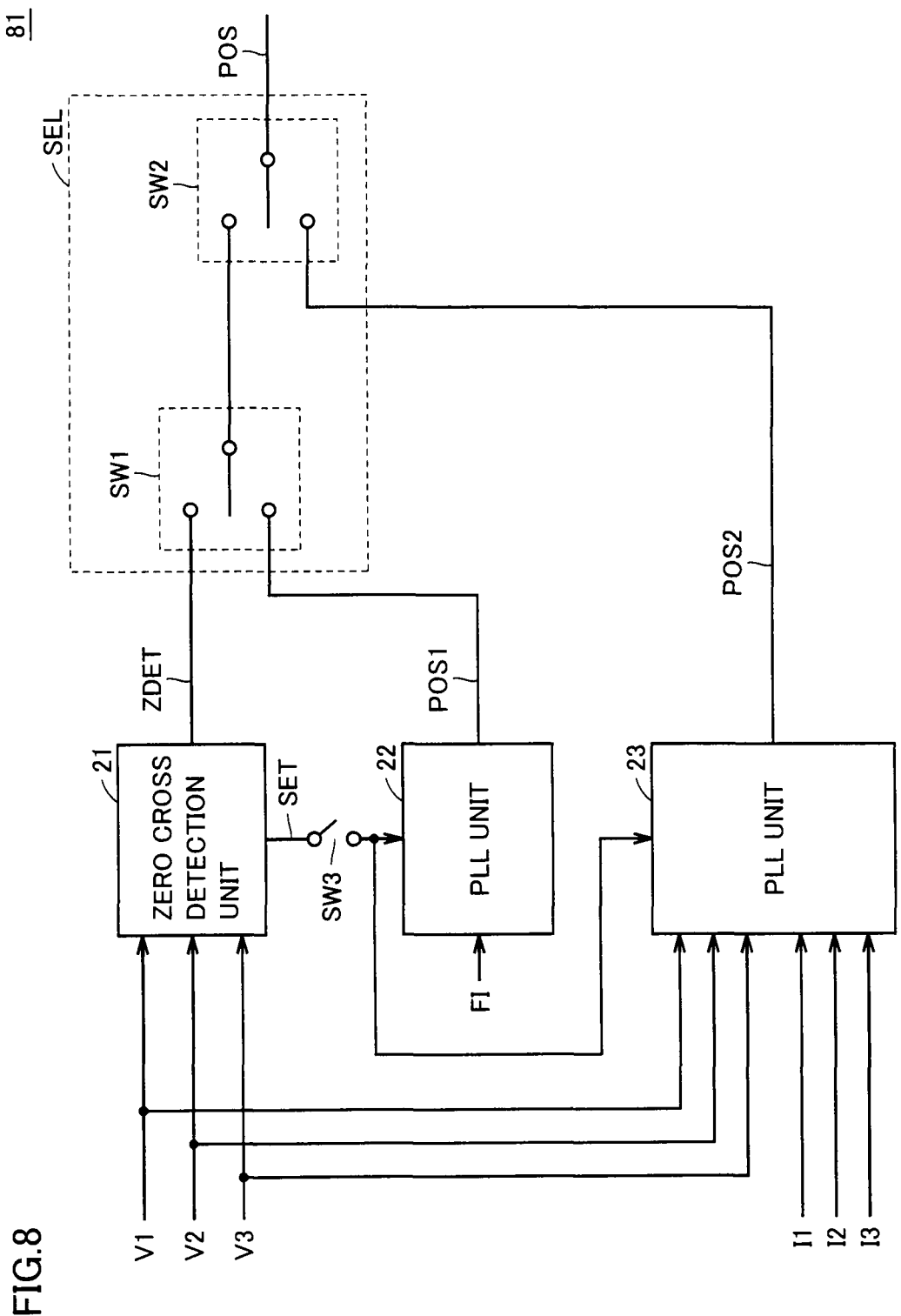
FIG. 8 is a diagram showing a configuration of a modification of rotor position detection unit 11.

FIG. 8 is a diagram showing a configuration of a modification of rotor position detection unit 11.

Referring to FIG. 8, a rotor position detection unit 81 includes zero cross detection unit (level monitoring unit) 21, PLL unit (AC signal generation unit) 22, PLL unit (feedback operation unit) 23, selector circuit SEL, and switching circuit SW3. Selector circuit SEL includes switching circuits SW1 and SW2.

If the detection voltage by AC voltage detector 8 is less susceptible to switching noise immediately after the starting of inverter 2, selector circuit SEL may omit positional signal POS 1 from PLL unit 22 and directly switch detection signal ZDET from zero cross detection unit 21 to position signal POS2 from PLL unit 23.

Here, switching circuit SW3 switches whether or not to output detection signal SET received from zero cross detection unit 21 to PLL units 22 and 23.

PLL unit 23 adjusts the phase of position signal POS2 based on detection signal SET received from switching circuit SW3.

Figure 9:
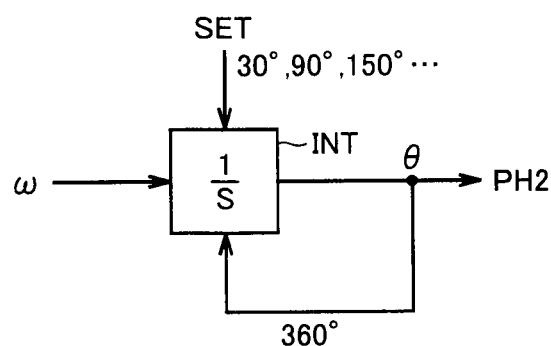
FIG. 9 is a diagram showing a configuration of an integration unit in a PLL circuit 34 in a modification of rotor position detection unit 11.

FIG. 9 is a diagram showing a configuration of an integration unit in PLL circuit 34 in a modification of rotor position detection unit 11.

Referring to FIG. 9, PLL circuit 34 includes an integration unit 72. Integration unit 72 has a similar configuration to that of PLL unit 22 shown in FIG. 3. More specifically, integrator INT integrates and converts rotational speed o calculated by PLL circuit 34 into phase θ, which is then output as reference phase φ, that is, phase signal PH2. Integrator INT resets phase θ to 0° when phase θ attains 360°. Integrator INT corrects phase θ based on the angle such as 30°, 90°, 150° indicated by detection signal SET received from zero cross detection unit 21.

In integration unit 72, initially, phase θ starts to be increased at any given timing, and then phase θ is adjusted in response to detection signal SET to be synchronized with the AC voltage supplied to the armature of synchronous machine 4. Thus, phase-matching is achieved.

Referring to FIG. 8 again, for example, selector circuit SEL selects detection signal ZDET, and thereafter selects position signal POS2 after PLL unit 23 adjusts the phase of position signal POS2 based on detection signal SET.

In rotor position detection portion 81 configured in this manner, after detection signal ZDET is switched to position signal POS2, position signal POS2 can be synchronized early with the AC voltage supplied to the armature of synchronous machine 4 and the voltage induced at the armature of synchronous machine 4.

In the synchronous machine starting device in accordance with the first embodiment of the present invention, power conversion portion 71 is configured to include converter 1, inverter 2, and DC reactor 3. However, the present invention is not limited thereto. Power conversion portion 71 may be, for example, a matrix converter, in place of converter 1, inverter 2, and DC reactor 3, as long as it is configured to include any circuit that converts supplied power into AC power and supply the AC power to the armature of synchronous motor 4.

Another embodiment of the present invention will now be described using the drawings. It is noted that in the figures the same or corresponding parts are denoted with the same reference signs, and a description thereof will not be repeated.

<Second Embodiment>

The present embodiment relates to a synchronous machine starting device in which the function of adjusting the initial phase of position signal POS2 is changed as compared with the synchronous machine starting device in accordance with the first embodiment.

Figure 10:
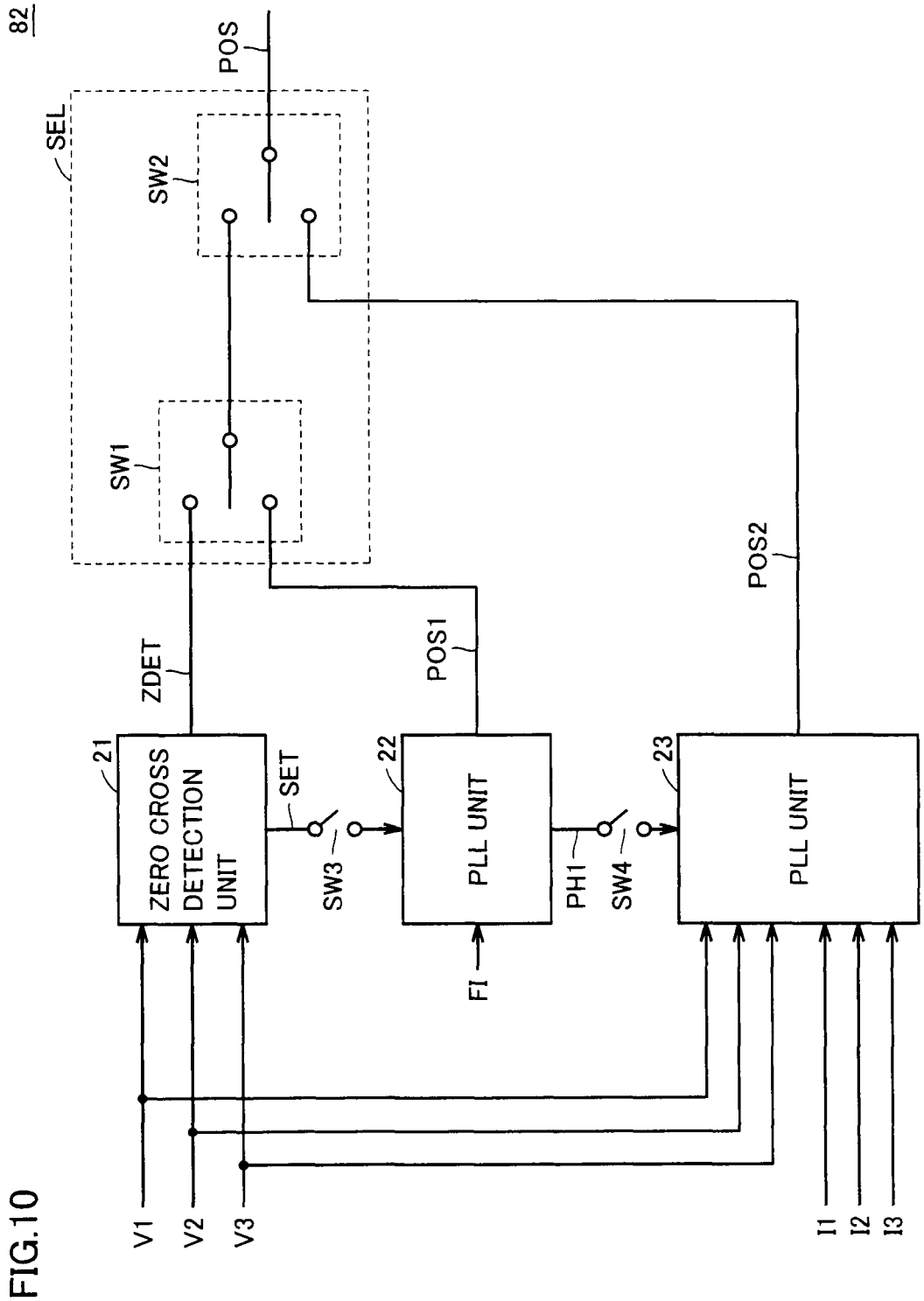
FIG. 10 is a diagram showing a configuration of a rotor position detection unit in accordance with a second embodiment of the present invention.

FIG. 10 is a diagram showing a configuration of a rotor position detection unit in accordance with the second embodiment of the present invention.

Referring to FIG. 10, a rotor position detection unit 82 differs from rotor position detection portion 11 in accordance with the first embodiment of the invention in that it further includes a switching circuit SW4.

Switching circuit SW4 switches whether or not to output phase signal PH1 received from PLL unit 22 to PLL unit 23.

PLL unit 23 adjusts the phase of position signal POS2 based on phase signal PH1 received from switching circuit SW4.

For example, selector circuit SEL selects position signal POS 1, and thereafter selects position signal POS2 after PLL unit 23 adjusts the phase of position signal POS2 based on phase signal PH1.

Figure 11:
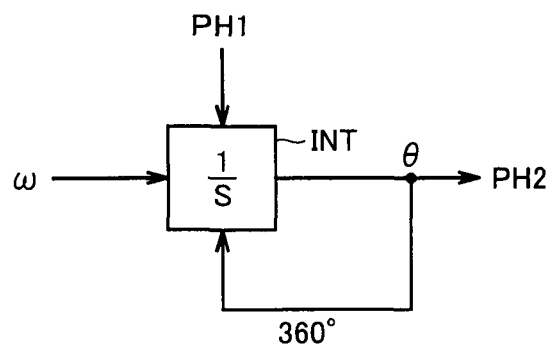
FIG. 11 is a diagram showing a configuration of an integration unit in PLL circuit 34 in accordance with the second embodiment of the present invention.

FIG. 11 is a diagram showing a configuration of an integration unit in PLL circuit 34 in accordance with the second embodiment of the invention.

Referring to FIG. 11, PLL circuit 34 includes an integration unit 73. Integration unit 73 has a similar configuration to that of PLL unit 22 shown in FIG. 3. More specifically, integrator INT integrates and converts rotational speed ω calculated by PLL circuit 34 into phase θ, which is then output as reference phase φ, that is, phase signal PH2. Integrator INT resets phase θ to 0° when phase θ attains 360°. Integrator INT corrects phase θ based on the angle indicated by phase signal PHI received from PLL unit 22.

In integration unit 73, initially, phase θ starts to be increased at any given timing, and then phase θ is adjusted in response to phase signal PHI to be synchronized with the AC voltage supplied to the armature of synchronous machine 4. Thus, phase-matching is achieved.

Now, phase signal PH2 is generated based on voltage detection values V1, V2, V3 received from AC voltage detector 8 and current detection values I1, I2, I3 received from AC current detector 9. At timing T3 when a prescribed time has elapsed since timing T2 at which inverter 2 is started, the selection by selector circuit SEL is switched from position signal POS1 to position signal POS2. This timing T3 is in a transition period before the amplitude of the AC voltage supplied to the armature of synchronous machine 4 becomes large enough. Therefore, if integration unit 73 is operated at an arbitrary timing, it may take time for position signal POS2 to be synchronized with the AC voltage supplied to the armature of synchronous machine 4 and the voltage inducted at the armature of synchronous machine 4.

However, in the synchronous machine starting device in accordance with the second embodiment of the present invention, the initial value of phase signal PH2 is matched with phase signal PHI, so that the estimation of the rotor position of synchronous machine 4 by PLL unit 23 can be started from the phase that is almost matched with the AC voltage supplied to the armature of synchronous machine 4 and the voltage induced at the armature of synchronous machine 4. In other words, after position signal POS1 is switched to position signal POS2, position signal POS2 can be synchronized early with the AC voltage supplied to the armature of synchronous machine 4 and the voltage induced at the armature of synchronous machine 4.

Figure 12:
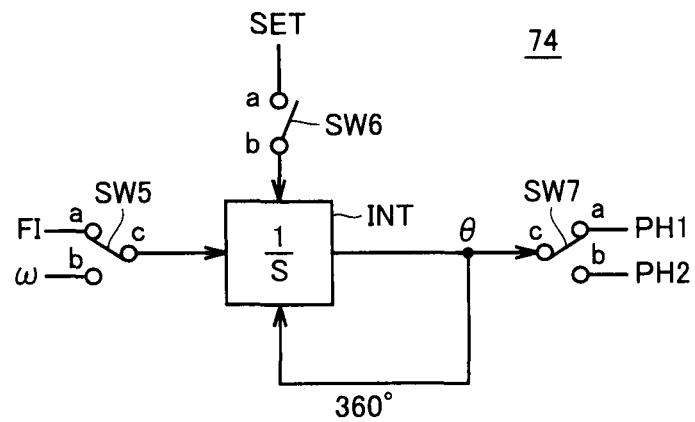
FIG. 12 is a diagram showing a configuration of a modification of the integration unit in the synchronous machine starting device in accordance with the second embodiment of the present invention.

FIG. 12 is a diagram showing a configuration of a modification of the integration unit in the synchronous machine starting device in accordance with the second embodiment of the invention.

Referring to FIG. 12, an integration unit 74 includes integrator INT and switching circuits SW5, SW6, SW7. Integration unit 73 is shared by PLL units 22 and 23.

More specifically, switching circuit SW5 switches whether to apply a prescribed frequency FI to integrator INT or to apply rotational speed ω calculated by PLL circuit 34 to integrator NT.

Switching circuit SW6 switches whether or not to apply detection signal SET received from zero cross detection unit 21 to integrator INT.

Switching circuit SW7 switches whether to output phase B from integrator INT as phase signal PH1 to the position signal generator or to output as phase signal PH2 to the position signal generator.

Integration unit 74 has a similar configuration to that of PLL unit 22 shown in FIG. 3. More specifically, integrator INT integrates and converts prescribed frequency FI or rotational speed ω applied from switching circuit SW5 into phase B for output. Integrator INT resets phase θ to 0° when phase θ attains 360°. Integrator NT corrects phase θ based on the angle such as 30°, 90°, 150° indicated by detection signal SET received from zero cross detection unit 21.

In integration unit 74, initially, phase θ starts to be increased at any given timing, and then phase θ is adjusted in response to detection signal SET to be synchronized with the AC voltage supplied to the armature of synchronous machine 4. Thus, phase-matching is achieved.

The operation of integration unit 74 will now be described.

First, when selector circuit SEL selects position signal POS1 from PLL unit 22, switching circuits SW5, SW6, SW7 are switched to the terminal a side. More specifically, switching circuit SW5 applies prescribed frequency FI to integrator TNT, switching circuit SW6 applies detection signal SET received from zero cross detection portion 21 to integrator INT, and switching circuit SW7 outputs phase θ from integrator INT as phase signal PH1 to the position signal generator.

Then, when selector circuit SEL selects position signal POS2 from PLL unit 23, simultaneously, switching circuits SW5, SW7 are switched to the terminal b side, and switching circuit SW6 is opened. More specifically, switching circuit SW5 applies rotational speed ω calculated by PLL circuit 34 to integrator INT, switching circuit SW6 does not apply detection signal SET received from zero cross detection unit 21 to integrator INT, and switching circuit SW7 outputs phase θ from integrator INT as phase signal PH2 to the position signal generator.

In this manner, integration portion 74 can be used to share the integration unit between PLL units 22 and 23, thereby achieving size reduction. In addition, as compared with rotor position detection unit 82 shown in FIG. 10, the passing of phase signal PHI between PLL units 22 and 23 becomes unnecessary. In other words, integrator INT can perform the integration operation, taking over the integration result as obtained immediately before timing T3 at which the selection by selector circuit SEL is switched from position signal POS1 to position signal POS2. This can simplify the circuit configuration.

Other configuration and operation are similar to the synchronous machine starting device in accordance with the first embodiment, and therefore, a detailed description thereof will not be repeated here.

Another embodiment of the present invention will now be described using the drawings. It is noted that in the figures the same or corresponding parts are denoted with the same reference signs, and a description thereof will not be repeated.

<Third Embodiment>

The present embodiment relates to a synchronous machine starting device which differs from the synchronous machine starting device in accordance with the first embodiment in that detection signal ZDET is not selected as rotor position signal POS. The description other than that given below is similar to that of the synchronous machine starting device in accordance with the first embodiment of the present invention.

Figure 13:
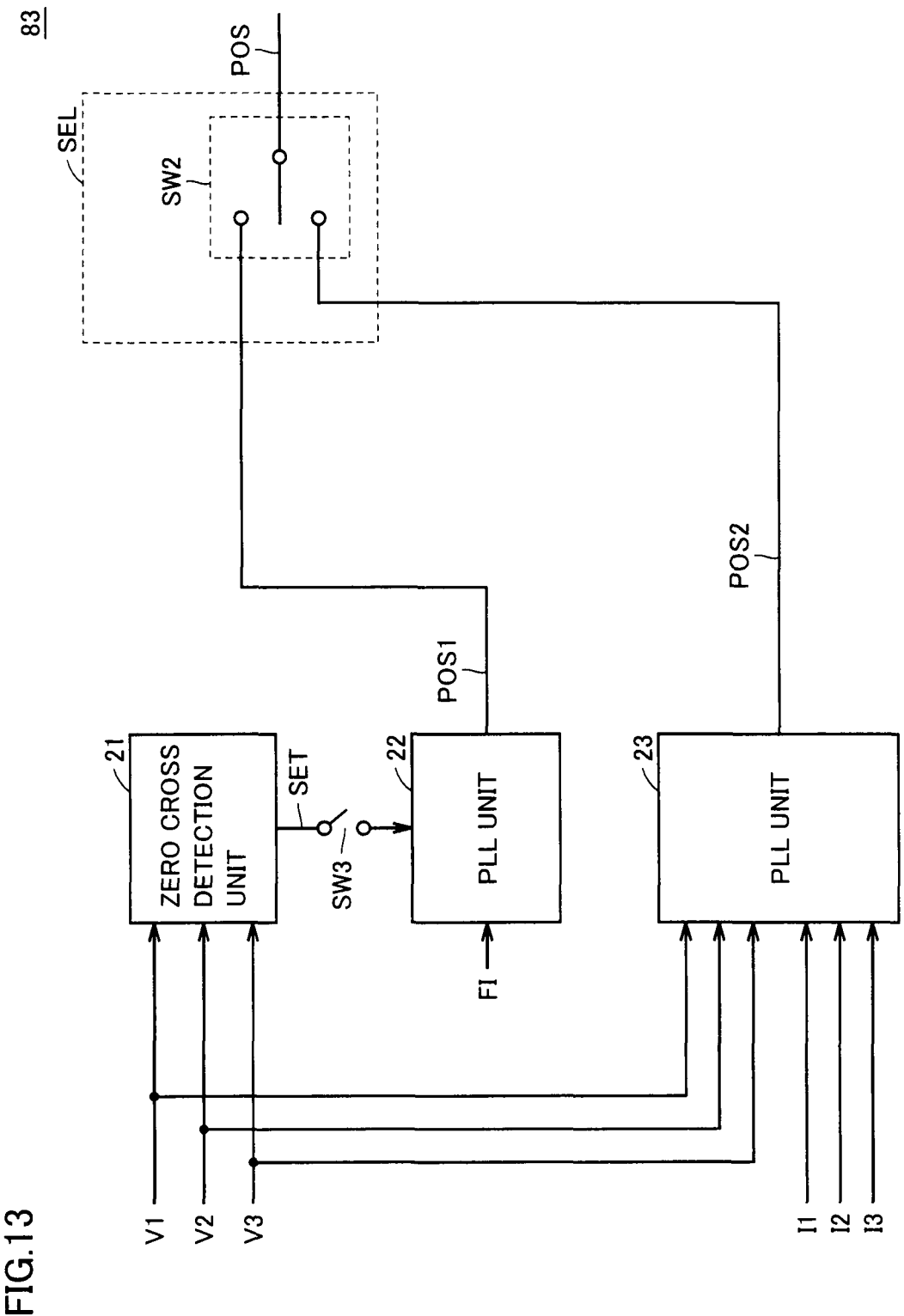
FIG. 13 is a diagram showing a configuration of a rotor position detection unit in accordance with a third embodiment of the present invention.

FIG. 13 is a diagram showing a configuration of a rotor position detection unit in accordance with the third embodiment of the invention.

Referring to FIG. 13, a rotor position detection unit 83 differs from rotor position detection unit 11 in accordance with the first embodiment of the invention in that selector circuit SEL does not include switching circuit SW1.

Selector circuit SEL selects one of position signal POS 1 and position signal POS2 and outputs the selected signal as rotor position signal POS to inverter control unit 19 to indicate the rotor position of synchronous machine 4.

Referring to FIG. 7 again, before turning, that is, the starting of inverter 2, selector circuit SEL first selects position signal POS1 from PLL unit 22. In other words, position signal POS 1 is output as rotor position signal POS to reference sinusoidal wave operator 12.

Here, switching circuit SW3 is turned ON, and PLL unit 22 receives detection signal SET from zero cross detection unit 21 to be synchronized with zero cross detection unit portion 21 and outputs position signal POS1 having almost the same frequency and phase as detection signal ZDET from zero cross detection unit 21.

Then, at timing T1 immediately before timing T2 at which inverter 2 is started, switching circuit SW3 is turned off. Thus, PLL unit 22 is not synchronized with zero cross detection unit 21 and enters a free-running state.

Here, at the time of starting of synchronous machine 4, the voltage supplied to the armature of synchronous machine 4 is extremely small as previously mentioned. Therefore, immediately after starting of inverter 2, zero cross detection unit 21 is susceptible to switching noise from inverter 2. More specifically, zero cross detection unit 21 erroneously detects a zero cross point and generates an erroneous detection signal ZDET as shown by NZ in FIG. 7 thereby to output an erroneous detection signal SET.

However, the synchronous machine starting device in accordance with the third embodiment of the invention is configured to bring PLL unit 22 into a free-running state at timing T1, thereby preventing the effect of switching noise from inverter 2.

Furthermore, since switching circuit SW3 is turned on to achieve synchronization between PLL unit 22 and zero cross detection unit 21 before timing TI, even in a free-running state, position signal POS1 can be matched in phase with the AC voltage supplied to the armature of synchronous machine 4. It is noted that rotor position detection unit 83 may be configured to bring PLL unit 22 into a free-running state at a timing T1 when the voltage supplied to the armature of synchronous machine 4 becomes larger than a prescribed value. Accordingly, PLL unit 22 can be synchronized with zero cross detection unit 21 in a state in which the voltage supplied to the armature of synchronous machine 4 reaches the level sufficient to perform zero cross detection, after synchronous machine 4 is excited.

Immediately after the starting, the rotational speed of synchronous machine 4 is low, and therefore, the period of AC voltage supplied to the armature of synchronous machine 4 may be long. Thus, rotor position detection unit 83 may be configured to bring PLL unit 22 into a free-running state at a timing T1 when a prescribed time has elapsed since the voltage supplied to the armature of synchronous machine 4 becomes higher than a prescribed value. The prescribed time is set such that zero cross detection can be performed accurately. Accordingly, the voltage supplied to the armature of synchronous machine 4 can be detected more accurately.

Then, at timing T3 when a prescribed time has elapsed since timing T2 at which inverter 2 is started, selector circuit SEL selects position signal POS2 from PLL unit 23. More specifically, position signal POS2 is output as rotor position signal POS to reference sinusoidal wave operator 12.

At timing T3 when a prescribed time has elapsed since timing T2 at which inverter 2 is started, the amplitude of AC voltage supplied to the armature of synchronous machine 4 is larger than at the time of starting. Therefore, the effect of switching noise from inverter 2 almost disappears, so that the rotor position can be estimated more accurately using the AC voltage and AC current supplied to the armature of synchronous machine 4, and synchronous machine 4 can be rotated stably.

It is noted that selector circuit SEL may be configured to select position signal POS2 from PLL unit 23 at a timing T3 when the voltage supplied to the armature of synchronous machine 4 exceeds a prescribed value, after timing T2 at which inverter 2 is started.

Alternatively, selector circuit SEL may be configured to select position signal POS2 from PLL unit 23 at a timing T3 when a prescribed time has elapsed since the voltage supplied to the armature of synchronous machine 4 exceeds a prescribed value, after timing T2 at which inverter 2 is started.

In the synchronous machine starting device in accordance with the third embodiment of the invention, PLL unit 22 adjusts the phase of position signal POS1 based on detection signal SET received from zero cross detection unit 21. Accordingly, even if detection signal ZDET from zero cross detection unit 21 is not selected as rotor position signal POS, the rotor position of synchronous machine 4 can be detected well by selecting position signal POS1 as rotor position signal POS. In this configuration, selector circuit SEL does not include switching circuit SW1, so that size reduction of the synchronous machine starting device can be achieved.

Other configuration and operation are similar to the synchronous machine starting device in accordance with the first embodiment, and therefore, a detailed description thereof will not be repeated here.

Anther embodiment of the present invention will now be described using the drawings. It is noted that in the figures the same or corresponding parts are denoted with the same reference signs, and a description thereof will not be repeated.

<Fourth Embodiment>

The present embodiment relates to a synchronous machine starting device in which the function of adjusting the initial phase of position signal POS2 is changed as compared with the synchronous machine starting device in accordance with the third embodiment.

Figure 14:
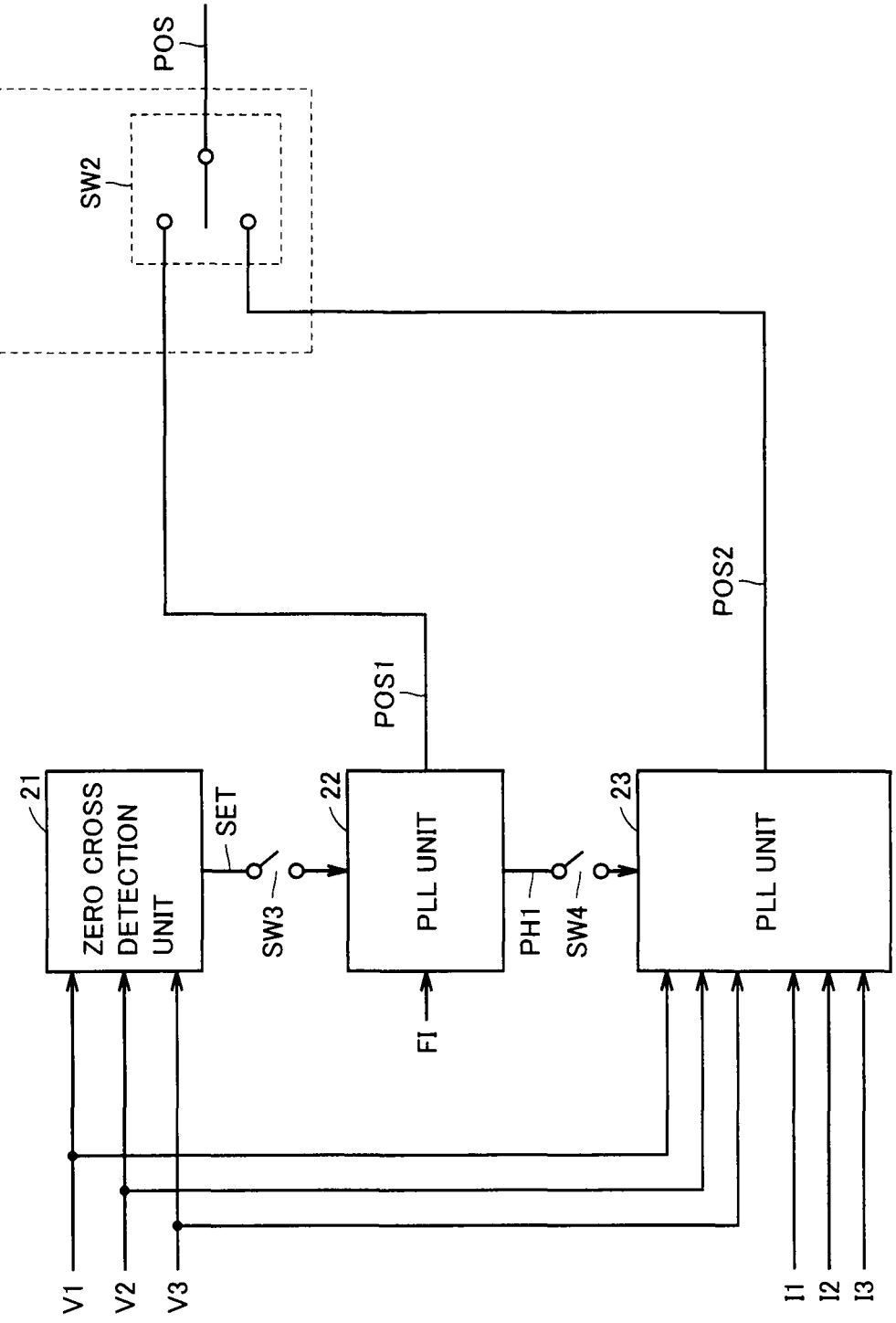
FIG. 14 is a diagram showing a configuration of a rotor position detection portion in accordance with a fourth embodiment of the present invention.

FIG. 14 is a diagram showing a configuration of a rotor position detection unit in accordance with the fourth embodiment of the invention.

Referring to FIG. 14, a rotor position detection unit 84 differs from rotor position detection unit 83 in accordance with the third embodiment of the invention in that it further includes switching circuit SW4.

Switching circuit SW4 switches whether or not to output phase signal PH1 received from PLL unit 22 to PLL unit 23.

PLL unit 23 adjusts the phase of position signal POS2 based on phase signal PH1 received from switching circuit SW4.

For example, selector circuit SEL selects position signal POS1, and thereafter selects position signal POS2 after PLL unit 23 adjusts the phase of position signal POS2 based on phase signal PH1.

The configuration and operation of integration units 73 and 74 in PLL circuit 34 of rotor position detection unit 84 is similar to the second embodiment of the invention, and therefore, a detailed description thereof will not be repeated.

Other configuration and operation are similar to the synchronous machine starting device in accordance with the first embodiment, and therefore, a detailed description thereof will not be repeated here.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:

1. A synchronous machine starting device comprising:
   a power conversion unit for converting supplied power into AC power and supplying the AC power to an armature of a synchronous machine;
   an AC voltage detection unit for detecting AC voltage supplied to the armature of said synchronous machine;
   a rotor position detection unit for detecting a rotor position of said synchronous machine, based on said detected AC voltage; and
   a power conversion control unit for controlling said power conversion unit, based on the detected rotor position,
   said rotor position detection unit including
   a level monitoring unit for outputting a first position signal indicating a timing at which a level of AC voltage supplied to the armature of said synchronous machine reaches a prescribed value, based on said detected AC voltage,
   a feedback operation unit for calculating an error of an estimated phase based on said estimated phase indicating said rotor position and said detected AC voltage, calculating said estimated phase based on the calculated phase error, and outputting a second position signal indicating the calculated estimated phase, and
   a selector circuit receiving said first position signal or a position signal obtained based on said first position signal, and said second position signal, selecting one of said received two position signals, and outputting the selected signal to said power conversion control portion as a signal indicating the rotor position of said synchronous machine.

2. The synchronous machine starting device according to claim 1, wherein said rotor position detection unit further includes an AC signal generation unit outputting a third position signal that is an AC signal having a prescribed frequency, and
   said selector circuit selects one of said first position signal, said second position signal, and said third position signal, and outputs the selected signal to said power conversion control unit as a signal indicating the rotor position of said synchronous machine.

3. The synchronous machine starting device according to claim 2, wherein said rotor position detection unit further includes a switching circuit for switching whether or not to output said first position signal to said AC signal generation unit, and
   said AC signal generation unit adjusts a phase of said third position signal based on said first position signal received from said switching circuit.

4. The synchronous machine starting device according to claim 3, wherein said selector circuit selects said first position signal, and thereafter selects said third position signal after said AC signal generation unit adjusts a phase of said third position signal based on said first position signal.

5. The synchronous machine starting device according to claim 2, wherein said rotor position detection unit further includes a switching circuit for switching whether or not to output said third position signal to said feedback operation unit, and said feedback operation unit adjusts a phase of said second position signal based on said third position signal received from said switching circuit.

6. The synchronous machine starting device according to claim 5, wherein said selector circuit selects said third position signal, and thereafter selects said second position signal after said feedback operation unit adjusts a phase of said second position signal based on said third position signal.

7. The synchronous machine starting device according to claim 2, wherein said selector circuit selects said first position signal, said third position signal, and said second position signal, in this order, and outputs the selected signal to said power conversion control unit.

8. The synchronous machine starting device according to claim 2, wherein said AC signal generation unit outputs a third position signal having a frequency corresponding to a predetermined rotational speed of the rotor during standby of said synchronous machine.

9. The synchronous machine starting device according to claim 2, wherein said selector circuit selects said first position signal and said third position signal, in this order, based on a level of said detected AC voltage, and outputs the selected signal to said power conversion control unit.

10. The synchronous machine starting device according to claim 9, wherein said selector circuit deselects said first position signal and selects said third position signal when a prescribed time has elapsed since a level of said detected AC voltage reaches a prescribed value or higher.

11. The synchronous machine starting device according to claim 2, wherein said selector circuit selects said third position signal and said second position signal, in this order, based on a level of said detected AC voltage, and outputs the selected signal to said power conversion control unit.

12. The synchronous machine starting device according to claim 11, wherein said selector circuit deselects said third position signal and selects said second position signal when a prescribed time has elapsed since a level of said detected AC voltage reaches a prescribed value or higher.

13. The synchronous machine starting device according to claim 1, wherein
said rotor position detection unit further includes a switching circuit for switching whether or not to output said first position signal to said feedback operation unit, and
said feedback operation unit adjusts a phase of said second position signal based on said first position signal received from said switching circuit.

14. The synchronous machine starting device according to claim 13, wherein said selector circuit selects said first position signal, and thereafter selects said second position signal after said feedback operation unit adjusts a phase of said second position signal based on said first position signal.

15. The synchronous machine starting device according to claim 1, wherein said selector circuit selects said first position signal and said second position signal, in this order, and outputs the selected signal to said power conversion control unit.

16. The synchronous machine starting device according to claim 1, wherein said selector circuit selects said first position signal and said second position signal, in this order, based on a level of said detected AC voltage, and outputs the selected signal to said power conversion control unit.

17. The synchronous machine starting device according to claim 16, wherein said selector circuit deselects said first position signal and selects said second position signal when a prescribed time has elapsed since a level of said detected AC voltage reaches a prescribed value or higher.

18. The synchronous machine starting device according to claim 1, wherein
said rotor position detection unit further includes
an AC signal generation unit for outputting a third position signal that is an AC signal having a prescribed frequency and
a switching circuit for switching whether or not to output said first position signal to said AC signal generation unit,
said AC signal generation unit adjusts a phase of said third position signal based on said first position signal received from said switching circuit, and
said selector circuit selects one of said second position signal and said third position signal and outputs the selected signal to said power conversion control unit as a signal indicating the rotor position of said synchronous machine.

19. The synchronous machine starting device according to claim 18, wherein said selector circuit selects said third position signal and said second position signal, in this order, and outputs the selected signal to said power conversion control unit.

20. The synchronous machine starting device according to claim 19, wherein said selector circuit selects said third position signal and said second position signal, in this order, based on a level of said detected AC voltage, and outputs the selected signal to said power conversion control unit.

21. The synchronous machine starting device according to claim 20, wherein said selector circuit deselects said third position signal and selects said second position signal when a prescribed time has elapsed since a level of said detected AC voltage reaches a prescribed value or higher.

22. The synchronous machine starting device according to claim 18, wherein
said rotor position detection unit further includes a switching circuit for switching whether or not to output said third position signal to said feedback operation unit, and
said feedback operation unit adjusts a phase of said second position signal based on said third position signal received from said switching circuit.

23. The synchronous machine starting device according to claim 22, wherein said selector circuit selects said third position signal, and thereafter selects said second position signal after said feedback operation unit adjusts a phase of said second position signal based on said third position signal.

24. The synchronous machine starting device according to claim 18, wherein said AC signal generation portion outputs said third position signal having a frequency corresponding to a predetermined rotational speed of the rotor during standby of said synchronous machine.

25. The synchronous machine starting device according to claim 1, further comprising an AC current detection unit for detecting AC current supplied to the armature of said synchronous machine,
wherein said feedback operation unit calculates induction voltage induced at the armature of said synchronous machine based on an estimated phase indicating said rotor position, an estimated rotational speed of the rotor, and said detected AC voltage and the detected AC current, calculates an error of said estimated phase based on said calculated induction voltage, calculates said estimated phase and said estimated rotational speed based on said calculated phase error, and outputs said second position signal indicating said calculated estimated phase.

* * * * *